United States Patent
Nomura et al.

(10) Patent No.: US 9,035,729 B2
(45) Date of Patent: May 19, 2015

(54) GAS CIRCUIT BREAKER PROVIDED WITH PARALLEL CAPACITOR

(71) Applicant: Hitachi, Ltd., Chiyoda-ku, Tokyo (JP)

(72) Inventors: Daisuke Nomura, Tokyo (JP); Masanori Tsukushi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/091,725

(22) Filed: Nov. 27, 2013

(65) Prior Publication Data
US 2014/0146422 A1 May 29, 2014

(30) Foreign Application Priority Data
Nov. 29, 2012 (JP) ................. 2012-260469

(51) Int. Cl.
*H01H 9/00* (2006.01)
*H02H 3/02* (2006.01)

(52) U.S. Cl.
CPC ....................... *H02H 3/02* (2013.01)

(58) Field of Classification Search
USPC ........................................... 335/177
See application file for complete search history.

(56) References Cited

U.S. PATENT DOCUMENTS

| | | | | | |
|---|---|---|---|---|---|
| 3,996,439 | A | * | 12/1976 | Tokuyama et al. | 218/62 |
| 4,161,711 | A | * | 7/1979 | Meister | 337/273 |
| 4,286,128 | A | * | 8/1981 | Ruffieux et al. | 218/43 |
| 4,465,910 | A | * | 8/1984 | Martin | 218/56 |
| 4,467,158 | A | * | 8/1984 | Kobayashi et al. | 218/57 |
| 5,072,084 | A | * | 12/1991 | Seki et al. | 218/59 |
| 5,079,391 | A | * | 1/1992 | Koyanagi et al. | 218/57 |
| 5,079,392 | A | * | 1/1992 | Tsukushi et al. | 218/59 |
| 5,153,397 | A | * | 10/1992 | Seki et al. | 218/62 |
| 5,155,312 | A | * | 10/1992 | Hashimoto et al. | 218/63 |
| 5,159,164 | A | * | 10/1992 | Koyanagi et al. | 218/62 |
| 7,911,303 | B2 | | 3/2011 | Morita et al. | |
| 2013/0168357 | A1 | * | 7/2013 | Yaginuma et al. | 218/57 |
| 2014/0144883 | A1 | * | 5/2014 | Urasaki et al. | 218/84 |
| 2014/0367361 | A1 | * | 12/2014 | Horinouchi et al. | 218/117 |

FOREIGN PATENT DOCUMENTS

| | | |
|---|---|---|
| JP | 4-341718 A | 11/1992 |
| JP | 5-31072 U | 4/1993 |
| JP | 9-161622 A | 6/1997 |
| KR | 10-2008-0063122 | 7/2008 |

OTHER PUBLICATIONS

Korean Office Action dated Jul. 28, 2014 (Five (5) pages).

* cited by examiner

*Primary Examiner* — Shawki S Ismail
*Assistant Examiner* — Lisa Homza
(74) *Attorney, Agent, or Firm* — Crowell & Moring LLP

(57) ABSTRACT

In a gas circuit breaker with a parallel capacitor, an interrupting unit is provided inside a sealed vessel filled with an insulating gas; the interrupting unit includes fixed and movable parts. A high-voltage conductor is coupled to the movable part, and an interrupting-unit side insulating rod for moving the movable part is linked with a mover as part of an electric actuator inside an operation device case. A capacitor is electrically coupled to the interrupting unit in parallel inside the sealed vessel. A movable contact is electrically coupled to the capacitor, and the movable contact is linked with a capacitor-side insulating rod. The interrupting-unit side insulating rod or mover has an engaging part inside the case, the capacitor-side insulating rod has a retaining part located on a side of the engaging part, and the retaining part is linked with the sealed vessel by use of a closing-spring.

6 Claims, 6 Drawing Sheets

GAS CIRCUIT BREAKER PROVIDED WITH PARALLEL CAPACITOR

CLAIM OF PRIORITY

The present application claims priority from Japanese Patent application serial no. 2012-260469, filed on Nov. 29, 2012, the content of which is hereby incorporated by reference into this application.

TECHNICAL FIELD

The present invention relates to a gas circuit breaker under high-voltage specifications, for use in a substation as well as a power station of an electric power system, and in particular, to a gas circuit breaker provided with a parallel capacitor of an electrically-driven type for interrupting a high-voltage current by electrically driving.

BACKGROUND ART

In a gas circuit breaker, a transient recovery voltage appears between breaker contactors after a current is interrupted. A rate of rise in the transient recovery voltage largely affects the interrupting performance of the breaker. With the gas circuit breaker according to the related art, in order to moderate the rate of rise in the transient recovery voltage, a capacitor has been installed in parallel across the poles of an arc-extinguishing chamber, having thereby enhanced the interrupting performance.

In Japanese Unexamined Patent Application Publication No. Hei 9 (1997)-161622 (Patent Literature 1), there is disclosed a breaker provided with a main interrupting unit housed in a vessel and a capacitor coupled in parallel with the main interrupting unit via a capacitor contact part. The breaker further incorporates a main interrupting unit operation-device for opening/closing the main interrupting unit, and a capacitor contact operation-device for opening/closing the capacitor contact part.

In Japanese Unexamined Patent Application Publication No. Hei 4 (1992)-341718 (Patent Literature 2), there is disclosed a gas circuit breaker including a capacitor disposed in a bar-like manner, and in parallel with a direction of movement of a movable contactor against a fixed contactor of the breaker, and further the breaker is provided with a disconnector part in which an extension part of an end of the capacitor, the end being positioned on the movable contactor side, serves as a fixed contact, and a movable side end of a rotatable lever for operating the movable contactor serves as a movable contact.

SUMMARY OF INVENTION

Technical Problem

In the case of the breaker provided with the parallel capacitor, disclosed in the Patent Literature 1, the main interrupting unit operation-device for opening/closing the main interrupting unit and the capacitor contact operation-device for opening/closing the capacitor contact part must be separately provided. Furthermore, an action-delay controller for controlling these operation-devices must be provided, so that there has existed a problem of an increase in the size of an operation mechanism.

Further, in the case of the breaker provided with the parallel capacitor, disclosed in the Patent Literature 2, a problem has existed in that the breaker becomes complicated in configuration, and the size thereof increases because the rotatable lever is in use, and the breaker is unable to cope with requirements in the case where adjustment is required of time by which an action of the parallel capacitor, at a contact, need be delayed in relation to an interrupting action.

Further, the breaker has a duty defined in standards stating that the function thereof must be maintained even in an action pattern in which actions for opening/closing of the interrupting unit are repeated and combined. This action duty has several types including an action duty of a high-speed re-closing whereby a closed-circuit action is again executed 0.3 sec after an open-circuit action of the interrupting unit to immediately execute the open-circuit action in succession. With the breaker provided with the parallel capacitor, disclosed in the Patent Literature 2, the opening/closing of the contact action of the parallel capacitor need to fall within 0.3 sec, and therefore, a problem has existed in that an operation device large in operating force is required in order to realize the high-speed re-closing.

The present invention has been developed in order to solve the problems described as above, and it is an object of the invention to provide a gas circuit breaker provided with a parallel capacitor, simple in configuration, highly reliable, and capable of inhibiting an increase in the size of an operation mechanism.

Solution to Problem

To that end, according to one aspect of the invention, there is provided a gas circuit breaker comprising a sealed vessel with an insulating gas filled therein, and an operation device case. An interrupting unit is provided inside the sealed vessel. The interrupting unit includes a fixed part, and a movable part capable of parting from or coming in contact with the fixed part. A high-voltage conductor is coupled to the movable part. An interrupting-unit side insulating rod is attached to the movable part and moves the movable part in a closing direction and an interrupting direction. The interrupting-unit side insulating rod is linked to a mover as a constituent of an electric actuator inside the operation device case. A capacitor is electrically coupled in parallel to the interrupting unit inside the sealed vessel. A movable contact is electrically coupled to the capacitor. A capacitor-side insulating rod is attached to the movable contact. The interrupting-unit side insulating rod or the mover has an engaging part inside the operation device case. The capacitor-side insulating rod has a retaining part to be engaged with the engaging part, the retaining part being located at a position on a side of the engaging part, farther away from the interrupting unit. And, the retaining part is linked with an end of the sealed vessel, adjacent to an operation unit by use of a closing-spring.

Advantageous Effects of Invention

With the gas circuit breaker provided with the parallel capacitor of the electrically-driven type, according to the invention, a delayed cut-off action at the contact of the parallel capacitor can be realized at the time of interrupting by use of a single operation mechanism and a simple configuration, so that it is possible to realize miniaturization of the breaker, and enhancement in reliability.

Further, use or non-use of successive execution of the interrupting action, and the action of the parallel capacitor, at the contact, can be selectively adopted by control although the single operation mechanism is used. Accordingly, the high-speed re-closing of the breaker can be realized with an operation device small in operating force.

DESCRIPTION OF EMBODIMENTS

Embodiment of a gas circuit breaker according to the invention are described hereinafter with reference to the accompanied drawings.
(First Embodiment)

Figure 1:
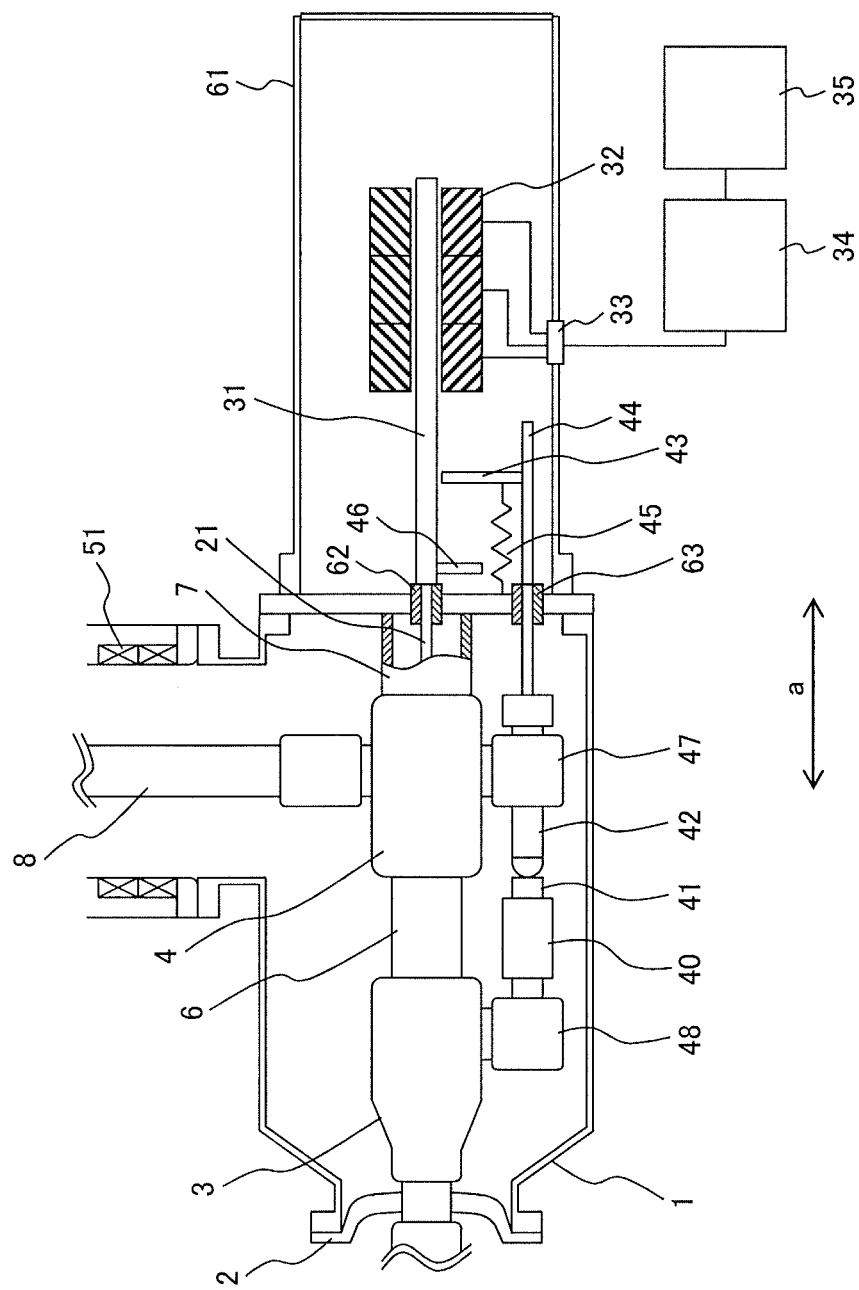
FIG. 1 is a schematic representation showing a gas circuit breaker provided with a parallel capacitor, according to a first embodiment of the invention.
Figure 2:
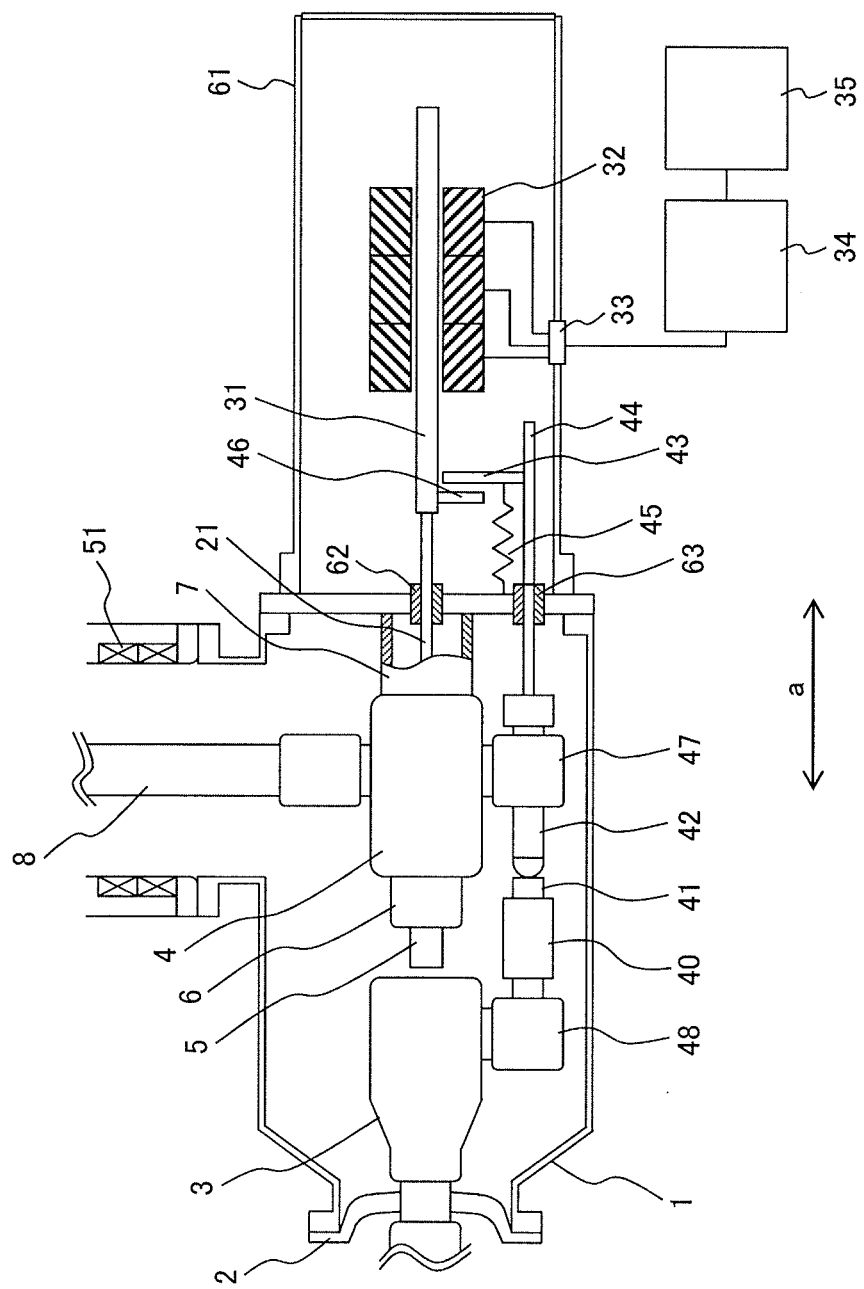
FIG. 2 is a schematic representation showing a state of the gas circuit breaker shown in FIG. 1, immediately after interrupting.
Figure 3:
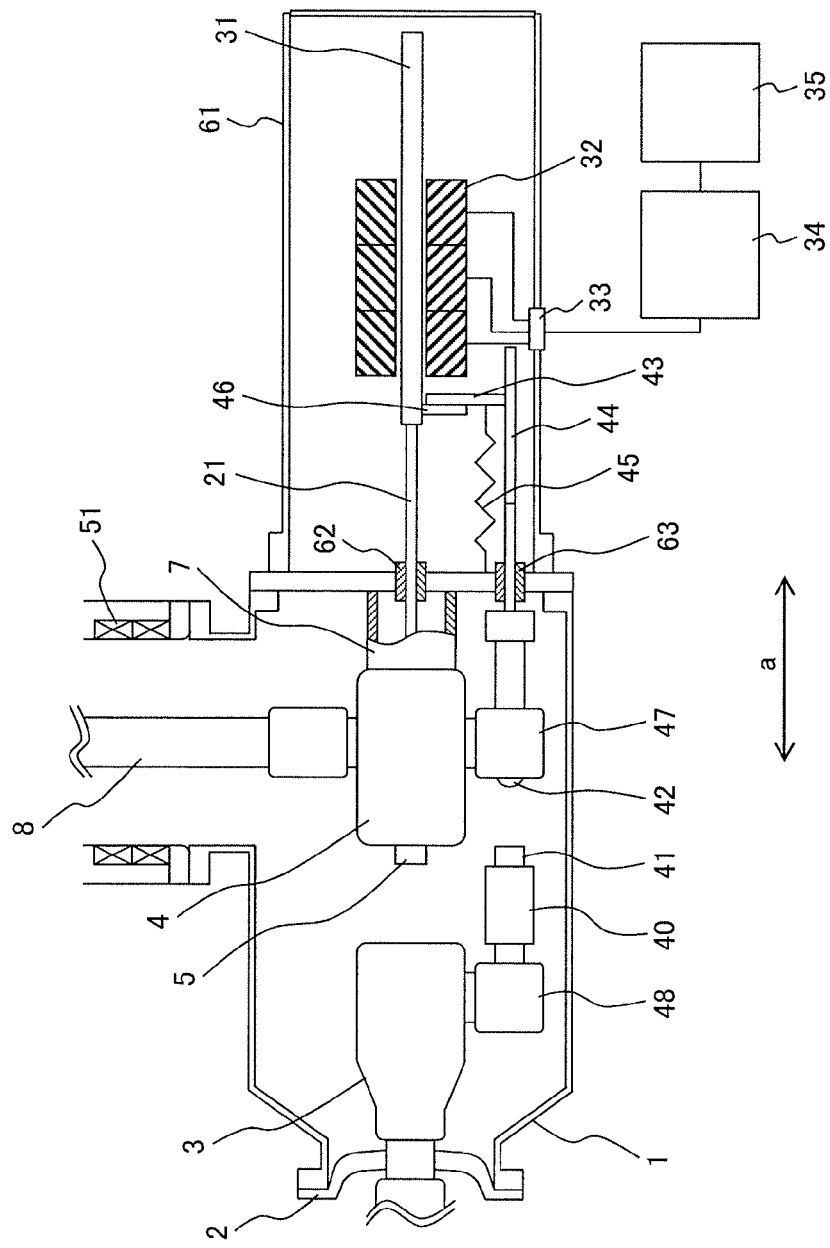
FIG. 3 is a schematic representation showing the gas circuit breaker shown in FIG. 1 in a state where the parallel capacitor is isolated.

A first embodiment of the invention is described with reference to FIGS. 1 through 5. One example of a gas circuit breaker provided with a parallel capacitor is shown in FIGS. 1 through 3. As shown in these figures, the gas circuit breaker according to the present embodiment is roughly divided into an interrupting unit for interrupting an accidental current, and an operation unit for operating the interrupting unit. FIG. 1 shows the gas circuit breaker in a state of closed electrodes, FIG. 2 shows a state of the gas circuit breaker, immediately after opened electrodes, and FIG. 3 shows the gas circuit breaker in a state where the parallel capacitor is isolated.

As shown in FIGS. 1 through 2, the interrupting unit is provided inside a sealed vessel 1 with an insulating $SF_6$ gas filled therein, being roughly divided into a fixed side and a movable side. The fixed side of the interrupting unit is made up of an insulating-support spacer 2 provided at an end of the sealed vessel 1, on the opposite side of the operation unit, and a fixed-side electrode 3 that is fixedly attached to the insulating-support spacer 2. The fixed-side electrode 3 is electrically isolated from the sealed vessel 1 through the intermediary of the insulation-support spacer 2.

An insulation-support tube 7 provided at an end of the sealed vessel 1, on a side thereof, adjacent to the operation unit, and a movable-side conductor 4 fixed to the insulation-support tube 7 are provided on the movable side of the interrupting unit. The movable-side conductor 4 is electrically isolated from the sealed vessel 1 through the intermediary of the insulation-support tube 7.

A high-voltage conductor 8 is coupled to the movable-side conductor 4 to be electrically continuous thereto. A movable electrode 6 is provided inside the movable-side conductor 4, and the movable electrode 6 is supported by the movable-side conductor 4, however, the movable electrode 6 is structured in such a way as to have flexibility in the direction of the arrow "a" in the figures (hereinafter referred to as an a-direction) so as to be movable only in the a-direction.

Further, the movable electrode 6, and the movable-side conductor 4 are electrically continuous to each other via mutual contact faces thereof. A nozzle 5 is provided at the tip of the movable electrode 6, and the nozzle 5 is moved integrally with the movable electrode 6.

The movable electrode 6 is structured so as to be put into the fixed-side electrode 3, and in a state where the movable electrode 6 is kept in the fixed-side electrode 3, as shown in FIG. 1, the movable electrode 6 is electrically continuous to the fixed-side electrode 3 via mutual contact faces thereof.

More specifically, with the interrupting unit in the state shown in FIG. 1, the fixed-side electrode 3, the movable electrode 6, the movable-side conductor 4, and the high-voltage conductor 8 are electrically continuous with each other, so that a current flows upon a voltage being applied between the fixed-side electrode 3 and the high-voltage conductor 8.

With the interrupting unit in a state where the movable electrode 6 is moved rightward in the a-direction to be parted from the fixed-side electrode 3, as shown in FIG. 2, electrical linkage between the fixed-side electrode 3 and the movable electrode 6 is cut off. An interrupting-unit side insulating rod 21 is connected to a side of the movable electrode 6, adjacent to the operation unit, and the interrupting-unit side insulating rod 21 passes inside the insulation-support tube 7 to be connected to the operation unit.

Upon the interrupting-unit side insulating rod 21 being moved rightward in the a-direction by the agency of an operation force from the operation unit, the movable electrode 6 as well is moved by following such a movement, so that the movable electrode 6 is moved so as to be electrically relieved from, or coupled to the fixed-side electrode 3, thereby enabling interrupting or inputting of a current that flows between the fixed-side electrode 3 and the high-voltage conductor 8.

A current transformer 51 serving as a current detector for detecting the current flowing to the high-voltage conductor 8 is provided on the periphery of the high-voltage conductor 8.

Provided in parallel with the interrupting unit are a parallel capacitor 40 fixed to a conductor 48 that is branched off from the fixed-side electrode 3, a fixed contact 41, and a movable contact 42. A capacitor-side insulating rod 44 is coupled to the movable contact 42 from the operation unit side of the breaker. The movable contact 42 is supported by a guide conductor 47 connected to the movable-side conductor 4, the movable contact 42 being structured so as to be movable in the a-direction, while being electrically continuous to the guide conductor 47.

The operation unit incorporates an electric actuator 32 provided inside an operation device case 61 that is installed so as to be adjacent to the sealed vessel 1, and a mover 31 capable of making a linear movement in the a-direction is disposed inside the electric actuator 32.

The mover 31 is linked with the interrupting-unit side insulating rod 21 through a linear seal 62 provided in such a way as to enable mover 31 to be driven while keeping air-tightness of the sealed vessel 1. The interrupting-unit-side insulating rod 21 is linked with the movable electrode 6. That is, the movable electrode 6 in the interrupting unit can be moved by the movement of the mover 31.

A capacitor-side insulating rod 44 having a motion axis substantially parallel with the motion axis of the mover 31 is disposed at a position adjacent to the mover 31, and the capacitor-side insulating rod 44 is linked with the movable contact 42 in the sealed vessel 1 through a linear seal 63 provided in such a way as to enable the capacitor-side insulating rod 44 to be driven while keeping air-tightness of the sealed vessel 1. That is, the movable contact 42 can be moved by the movement of the capacitor-side insulating rod 44.

The mover 31 has an engaging part 46, being configured such that the engaging part 46 is engaged with a retaining part 43 halfway through a stroke of the mover 31 moving in a direction under which the mover 31 is parted away from the interrupting unit (rightward in the a-direction), and the capacitor-side insulating rod 44 can be moved in a direction under which the capacitor-side insulating rod 44 is parted away from the parallel capacitor 40 by the operation force of the electric actuator 32 after the engaging part 46 is engaged with the retaining part 43. Further, the engaging part 46 may be provided on the interrupting-unit-side insulating rod 21 if the engaging part 46 can be engaged with the retaining part 43 inside the operation device case 61.

More specifically, the movable electrode 6 can be moved integrally with the movable contact 42 from halfway through the stroke by the rightward movement, in the a-direction, within the interrupting unit. Further, the engaging part 46 of the mover 31 must be provided at a position where the retaining part 43 is not pushed immediately after interrupting, as shown in FIG. 2.

The retaining part 43 is linked with an end of the sealed vessel 1, on a side thereof, adjacent to the operation unit, by the urging of an elastic body such as a closing-spring 45 tending to hold the movable contact 42 in a closing state, and so forth. When the mover 31 is moved leftward in the a-direction, the movable contact 42 returns by an elastic force of the closing-spring 45 until the movable contact 42 comes in contact with the fixed contact 41. Further, for the closing-spring 45, it is necessary to select a spring having an elastic force weaker than the thrust force of the mover 31, but sufficient for the movement of the movable contact 42.

Still further, the closing-spring 45 preferably has a motion axis substantially parallel with the respective motion axes of the capacitor-side insulating rod 44, the mover 31, and the interrupting-unit-side insulating rod 21. By so doing, a drive force from the electric actuator 32 can be efficiently used for an opening/a closing action on the capacitor side.

The electric actuator 32 is electrically coupled to a power supply unit 34 for generating a drive current to be supplied to the electric actuator 32 via a sealed terminal 33 provided on the surface of the operation device case 61.

The power supply unit 34 is further coupled to a control unit 35 to be configured so as to receive a command from the control unit 35. The control unit 35 sends out a control signal for controlling the movement of the electric actuator 32 to the power supply unit 34, and the power supply unit 34 varies a current amount as well as a phase of the drive current to be supplied to the electric actuator 32 according to the control signal received from the control unit 35.

The control unit 35 is connected to a control center of a substation or a power station, working as a mechanism for varying the current amount as well as the phase, supplied to the electric actuator 32 from the power supply unit 34, according to an inputting command as well as a tripping command of the interrupting unit, as received from the control center, thereby controlling the opening/closing action of the interrupting unit.

Figure 4:
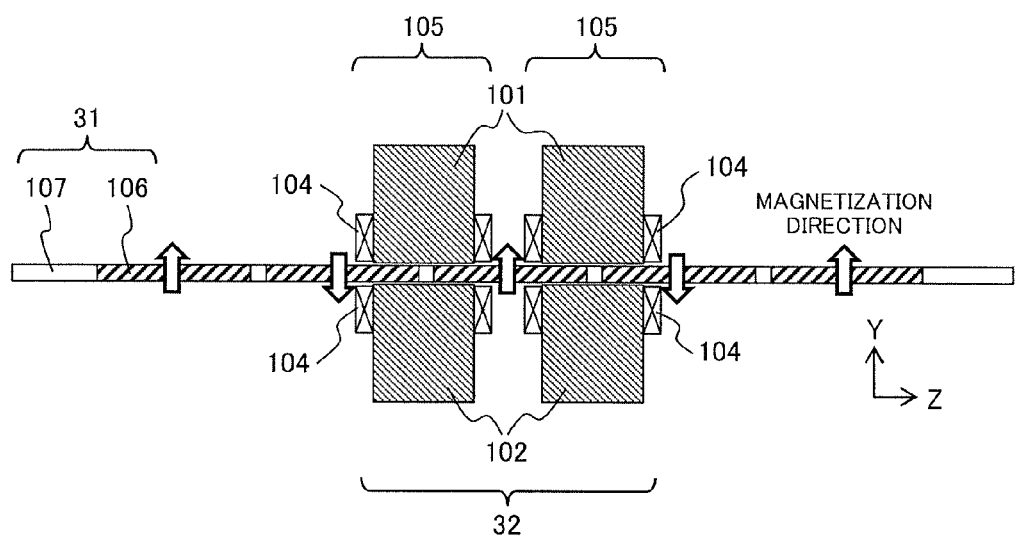
FIG. 4 is a schematic representation showing one example of an electric actuator according to the invention.
Figure 5:
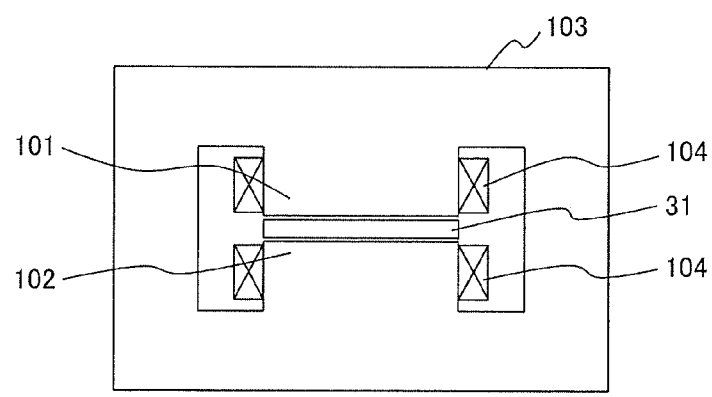
FIG. 5 is a schematic representation showing a sectional configuration of the electric actuator shown in FIG. 4, as seen from a z-direction.

A structure of the electric actuator 32 is described hereinafter with reference to FIGS. 4, and 5. FIG. 4 shows one example of the electric actuator 32, and FIG. 5 is a view showing the sectional shape of a stator 105 shown in FIG. 4, as seen from a z-direction.

The electric actuator 32 is made up of, for example, the stator 105, and the mover 31. The stator 105 is made up of a magnetic body 103, a first magnetic pole 101 of the magnetic body 103, a second magnetic pole 102 disposed so as to oppose the first magnetic pole 101, and a winding 104 disposed on the respective outer peripheries of the first magnetic pole 101 and the second magnetic pole 102, as shown in FIG. 5. The electric actuator 32 is configured such that the mover 31 made up of a permanent magnet 106, and a magnet-fixing member 107 for supporting the permanent magnet 106 by tucking is disposed between the first magnetic pole 101 and the second magnetic pole 102 via an air gap.

The magnetization direction of the permanent magnet 106 is a y-direction (the vertical direction in FIG. 4), and as for adjacent magnets, the magnetization direction alternates on a magnet-by-magnet basis. Further, the quality of the magnet-fixing member 107 is a non-magnetic material.

The mover 31 is supported by a mechanical part for restraining movements in directions other than the z-direction in order to maintain an interval between the permanent magnet 106 and the first magnetic pole 101, and an interval between the permanent magnet 106 and the second magnetic pole 102. Because the stator 105, and the permanent magnet 106 are relatively driven in the z-direction, the mover 31 including the permanent magnet 106 is moved in the z-direction upon the stator 105 being fixed.

With flow of a current, into the winding 104, at the time of driving, a magnetic field is generated, thereby enabling thrust corresponding to a relative position between the stator 105 and the permanent magnet 106 to be produced. Further, by controlling a positional relationship between the stator 105 and the permanent magnet 106, and magnitude as well as a phase of the current flowing into the winding 104, the thrust can be adjusted in respect of magnitude and orientation.

Action control of the mover 31 is carried out by passing a current from the power supply unit 34 to the electric actuator 32 according to the case where an open-electrode command, and a close-electrode command are each inputted to the control unit 35, whereupon the electric actuator 32 converts an electric signal into a driving force of the mover 31.

The electric actuator 32 generates an operating force through conduction of the current, thereby realizing stopping of the movable electrode 6 at positions of not less than three locations in total, including a stroke-intermediary position in addition to a stroke-advancing-end position, and a stroke-retreat-end position without the necessity of installing a complex linkage mechanism.

Now, description given as above strictly represents just one example, and another type of electric actuator may be used if the same is structured in such a way as to enable the electric signal to be converted into the driving force, magnitude as well as orientation of the driving force to be controlled, and the mover to be stopped or re-driven at the positions of not less than the three locations in total, including the stroke-advancing-end position, the stroke-retreat-end position, and the stroke-intermediary position.

Figure 6:
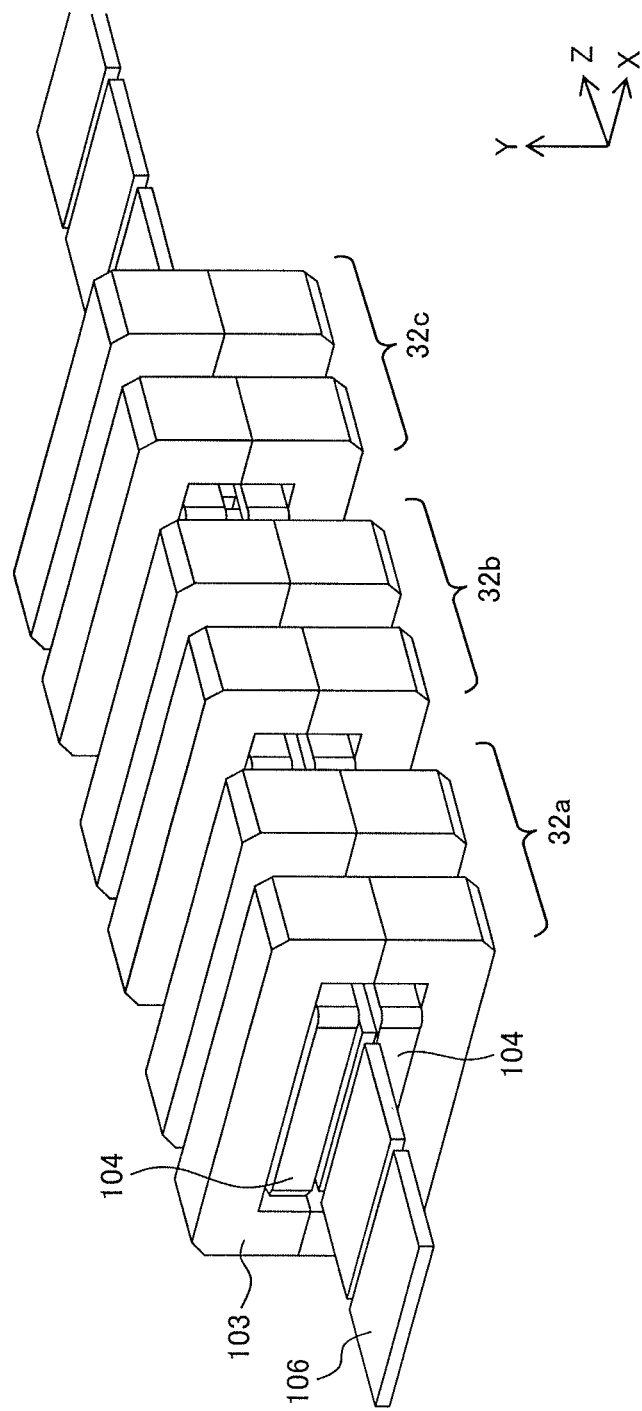
FIG. 6 is a perspective view showing another configuration of the electric actuator according to the invention.
Figure 7:
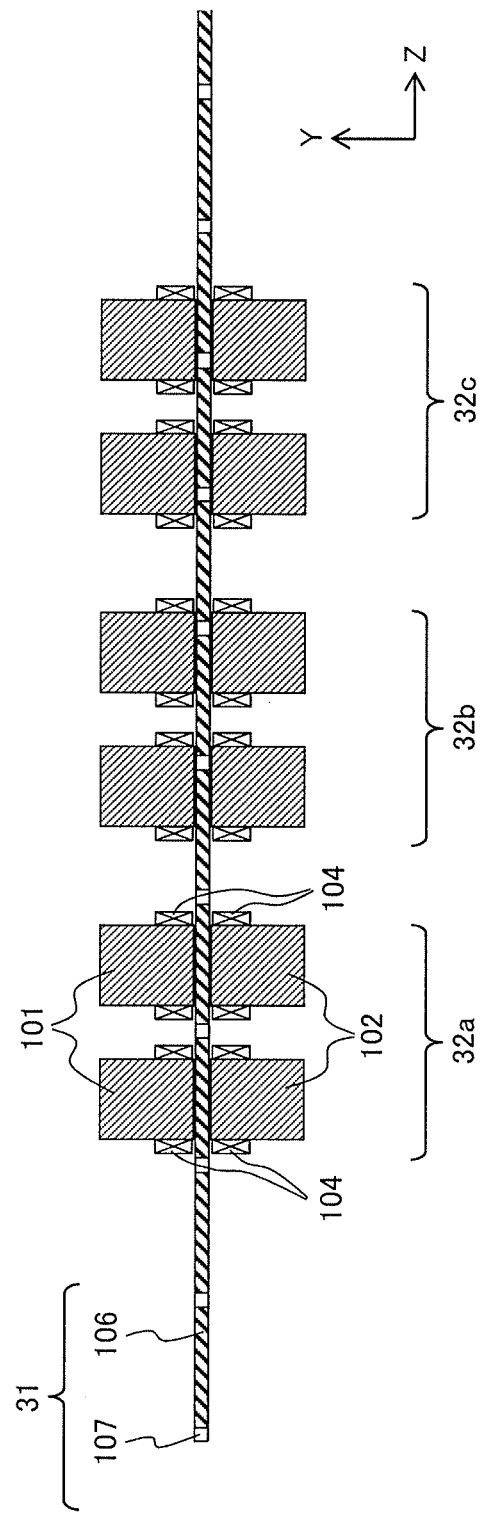
FIG. 7 is a view showing the sectional configuration of the electric actuator shown in FIG. 6.

The electric actuator applied to the present embodiment is described with reference to FIGS. 6 and 7. With the present embodiment, three units of the electric actuators 32a, 32b and 32c are disposed so as to be lined up side by side in the z-direction (the direction of the motion axis of the movable electrode 6). With the present embodiment, one unit of the electric actuator is made up of two stators, as described above, so that the three units of the electric actuators include six pieces of the stators in total, however, the one unit of the electric actuator may be made up of not less than one stator, so that the three units of the electric actuators may be made up of 3-multiple pieces of the stators.

The electric actuator 32b is disposed so as to be shifted by 120° in electrical phase in relation to the electric actuator 32a, while the electric actuator 32c is disposed so as to be shifted by 240° in electrical phase in relation to the electric actuator 32a.

In this layout of the electric actuators, the same action as in the case of a three-phase linear motor can be realized by causing three-phase current to flow to the winding 104 of each of the electric actuators. With the use of the three units of the electric actuators, thrust can also be adjusted by individually controlling a current flowing to the respective electric actuators, regarded as the three independent electric actuators.

Various currents differing in magnitude or phase from each other can be injected from a control mechanism into the winding of each of the actuators. As one method for implementing the above, it is conceivable to separately supply 3-phase (U, V, W) currents supplied from an AC power source. In such a case, there is no need for providing a plurality of power sources, thereby rendering the method quite simple. Further, in this case, the sealed terminal 33 may be shared by the electric actuators.

There is described hereinafter an action of the gas circuit breaker provided with the parallel capacitor, according to the present embodiment. In FIG. 1, there is shown the gas circuit breaker provided with the parallel capacitor, in a closed-electrode state. In this state, the mover 31 is held at an end of a stroke, adjacent to the interrupting unit, by a command from the control unit 35, and the fixed-side electrode 3 is electrically coupled to the movable-side conductor 4 via the movable electrode 6, thereby forming a main circuit. Further, the fixed contact 41 and the movable contact 42 are closed to each other, and the parallel capacitor 40 is electrically coupled in parallel with the main circuit.

If a tripping command from the control center is inputted to the control unit 35 when the breaker is in this state, the electric actuator 32 is driven by a command from the control unit 35, and the movable electrode 6 is moved rightward in the a-direction to be electrically released. FIG. 2 shows the state of the breaker, immediately after this interrupting action.

With the breaker in this state, the engaging part 46 has not yet pushed the retaining part 43, so that the movable contact 42 has not moved, and therefore, the parallel capacitor 40 is electrically parallel-coupled between the electrodes.

An arc occurs between the electrodes even if the movable electrode 6 is away from the fixed-side electrode 3 at the time of the interrupting action, and electrical linkage is kept between the fixed-side electrode 3 and the movable electrode 6, so that the arc disappears upon a compressed gas being blasted from a nozzle 5 to thereby realize interrupting. With the breaker of such a type as described above, in order to succeed in the interrupting, there is the need for presence of insulation between the electrodes, capable of withstanding a transient recovery voltage generated immediately after the interrupting is attained.

Further, a method whereby a capacitor is parallel-coupled between the electrodes of the breaker to thereby slow down rising of the transient recovery voltage in order to enhance the interrupting performance of a breaker has so far been in widespread use. However, in the case of the method according to the related art, since the state where the capacitor is parallel-coupled between the electrodes is maintained, flow of a current occurs via the capacitor after the interrupting. If the current transformer detects the flow of the current, via the capacitor, after completion of the interrupting, the success or failure of the interrupting will become unclear, thereby raising the risk of upsetting control inside a substation.

Further, if a task is performed in awareness that the interrupting of the system has been completed with the use of the breaker, and safety is therefore ensured in the case where tasks are executed in a substation, this will raise the risk of causing an electric shock accident due to a system voltage as impressed via the parallel capacitor. A problem exists in that the larger magnitude of a current to be interrupted by a breaker, the larger a necessary capacity of a capacitor will become, so that the risk of using the parallel capacitor will become higher.

With the present embodiment, the state of the gas circuit breaker, shown in FIG. 2, is maintained immediately after the completion of the interrupting, and the rising of the transient recovery voltage is slowed down to thereby interfere with re-arcing. Thereafter, the electric actuator 32 is driven according to the command from the control unit 35, after the transient recovery voltage recedes, thereby causing the movable electrode 6 to move further rightward in the a-direction. At this point in time, the engaging part 46 of the mover 31 acts in such a way as to push the retaining part 43, and the movable contact 42 as well is moved in conjunction with such an action as described, whereupon the movable contact 42 is separated from the fixed contact 41.

Furthermore, the closing-spring 45 is extended at the same time, so that an elastic force required at the time of re-closing is built up. FIG. 3 shows a state of the gas circuit breaker, where the interrupting unit is opened up to an end of the stroke, on the operation unit side. As a result of this action, the parallel capacitor 40 is separated from the main circuit, thereby resolving the risk of the current flowing via the parallel capacitor 40.

In the operation unit of the gas circuit breaker, wide-spread use has since been made of a spring-operation unit, and a hydraulic operation unit, capable of momentarily acquiring a large thrust by the agency of elasticity of a spring, and supply of compressed oil, respectively, however, a driving speed of the interrupting unit is dependent on balance among an inertia force acting on a movable part, a frictional force occurring to a sliding surface, a reaction force received by the movable part of the interrupting unit from $SF_6$ gas heated up by the arc, and an operating force of the operation device. Accordingly, the driving speed of the interrupting unit cannot be freely controlled with the use of the spring-operation unit, and the hydraulic-operation unit, incapable of changing the thrust to an optional thrust during the action of the interrupting unit. Further, for structural reasons of the spring and a hydraulic cylinder, respectively, it is difficult to stop, and resume the action halfway through the stroke.

In order to realize an action at the contact of the parallel capacitor, being delayed from interrupting action, by use of the spring-operation unit, or the hydraulic operation unit, as described in the present embodiment, a method is conceivable, whereby interrupting is executed in combination with a linkage mechanism and so forth in the first half of the action stroke of the operation unit, and the contact of the parallel capacitor is opened in the last half of a continuing action stroke. However, with this method, a structure becomes complex, and the operation unit will increase in size. Furthermore, there also exists a concern about the necessity of disassembling the operation unit to be reassembled in the case where it becomes necessary to adjust a time length by which the contact action of the parallel capacitor need be delayed from the interrupting action.

In contrast, if the electric actuator 32 is used in the operation unit as described in the case of the present embodiment, it is possible to not only accelerate or decelerate the action of the mover 31 halfway through the stroke, but also maintain a stop state of the mover 31 at an optional position for an optional time length by controlling the magnitude as well as the phase of a current supplied to the electric actuator 32.

Accordingly, the operation unit can be reduced in size, and since it is possible to cope with a change in the time length by which the contact action of the parallel capacitor 40 need be delayed from the interrupting action, a task for reassembling the operation unit does not occur.

Further, the breaker has the duty defined in standards stating that the function thereof must be maintained even in the action pattern in which actions for opening/closing of the interrupting unit are repeated and combined. This action duty has the several types including the action duty of the high-speed re-closing whereby the closed-circuit action is again executed 0.3 sec after the open-circuit action of the interrupting unit to immediately execute the open-circuit action in succession.

With the method for realizing a delayed action at the contact of the parallel capacitor by combination of a single operation mechanism and the linkage mechanism, the opening/closing of the interrupting unit, and the contact action of the parallel capacitor occur in succession to each other, so that there is the need for the opening/closing in the contact action of the parallel capacitor falling within 0.3 sec, and therefore, a problem has existed in that an operation device large in operating force is required in order to realize the high-speed re-closing.

In contrast, with the present embodiment, although the electric actuator is the single operation mechanism, the magnitude as well as the orientation of the thrust acting on the mover can be freely controlled in the action stroke, and it is possible to selectively use a control for successively executing the interrupting action, and the action of the parallel capacitor, at the contact, and a control for shifting to an action to close the interrupting unit again, while keeping the contact of the parallel capacitor in the closed state, as necessary, so that the high-speed re-closing can be realized with the use of an operation device small in operating force.

The technique relating to a method for separating the parallel capacitor from the gas circuit breaker provided with the parallel capacitor after successful interrupting has been developed in the past, however, with this method, an operation device for operating the main interrupting unit, and an operation device for operating the contact of the parallel capacitor are separately required, so that there exists a concern about an increase in the size of facilities.

With the method according to the present embodiment, the closing-spring 45 is required for an action to cause return of the movable contact 42, however, other actions can be consolidated in the action of the one unit of the electric actuator, so that advantageous effect of reduction in the size of the facilities can be expected.

Further, there has since been developed a method whereby one operation device is provided, and a mechanical unit for executing interrupting in the first half of an action stroke of the operation device, whereas the contact of the parallel capacitor is opened in the last half of the action stroke in succession, thereby obtaining the same effects as obtained in the case of the present embodiment. However, in this case, the mechanical unit becomes complex in structure. In contrast, the method according to the present embodiment has the advantage of simplicity in structure to thereby enable reliability to be enhanced.

More specifically, with the use of the operation device of the electric actuator type, a small-sized and highly reliable gas circuit breaker provided with a parallel capacitor can be realized owing to the advantageous effects that the mover can be freely stopped at positions of not less than one optional location, including the stroke advancing-end position, the stroke retreat-end position, and the stroke intermediary position, without use of a complex linkage mechanism.

REFERENCE SIGNS LIST

1 . . . sealed vessel, 2 . . . insulation-support spacer, 3 . . . fixed-side electrode, 4 . . . movable-side conductor, 5 . . . nozzle, 6 . . . movable electrode, 7 . . . insulation-support tube, 8 . . . high-voltage conductor, 21 . . . interrupting-unit side insulating rod, 31 . . . mover, 32 . . . electric actuator, 33 . . . sealed terminal, 34 . . . power supply unit, 35 . . . control unit, 40 . . . parallel capacitor, 41 . . . fixed contact, 42 . . . movable contact, 43 . . . retaining part, 44 . . . capacitor-side insulating rod, 45 . . . closing-spring, 46 . . . engaging part, 47 . . . guide conductor, 48 . . . conductor, 51 . . . current transformer, 61 . . . operation device case, 62 . . . linear seal, 63 . . . linear seal, 101 . . . first magnetic pole, 102 . . . second magnetic pole, 103 . . . magnetic body, 104 . . . winding, 105 . . . stator, 106 . . . permanent magnet, 107 . . . magnet fixing member.

CITATION LIST

[Patent Literature]
[Patent Literature 1] JP-A No. Hei 9 (1997)-161622
[Patent Literature 2] JP-A No. Hei 4 (1992)-341718

The invention claimed is:

1. A gas circuit breaker comprising:
a sealed vessel with an insulating gas filled therein;
an operation device case;
an interrupting unit provided inside the sealed vessel, the interrupting unit including a fixed part and a movable part capable of parting from or coming in contact with the fixed part;
a high-voltage conductor coupled to the movable part;
an interrupting-unit side insulating rod attached to the movable part, the interrupting-unit side insulating rod moving the movable part in a closing direction and an interrupting direction;
an electric actuator including a mover, the mover linking to the interrupting-unit side insulating rod inside the operation device case;
a capacitor electrically coupled in parallel to the interrupting unit inside the sealed vessel;
a movable contact electrically coupled to the capacitor; and
a capacitor-side insulating rod attached to the movable contact,
wherein the interrupting-unit side insulating rod or the mover has an engaging part inside the operation device case,
wherein the capacitor-side insulating rod has a retaining part to be engaged with the engaging part, the retaining part being located at a position on a side of the engaging part, farther away from the interrupting unit, and
wherein a closing-spring is provided so as to link the retaining part with an end of the sealed vessel, adjacent to the operation device case.

2. The gas circuit breaker according to claim 1,
wherein the mover, the interrupting-unit side insulating rod, the capacitor-side insulating rod, and the closing-spring have respective motion axes substantially in parallel with each other.

3. The gas circuit breaker according to claim 2, wherein the electric actuator includes:
the mover integrally formed of a plurality of pieces of permanent magnets or magnetic materials, lining up side-by-side while inverting a magnetization direction thereof;
a stator including a first magnetic pole and a second magnetic pole disposed in such a way as to vertically tuck the mover, a magnetic body linking the first magnetic pole to the second magnetic pole, thereby forming a path for a magnetic flux, and a winding wound around the first magnetic pole and the second magnetic pole, respectively;

a current detector for detecting a current flowing to the high-voltage conductor; and a control mechanism for varying the amount of a current to be supplied to the winding, so as to correspond to a current value detected by the current detector.

4. The gas circuit breaker according to claim 3, wherein a plurality of the stators are disposed in the traveling direction of the mover, the number of the stators being an integral multiple of 3, the winding is disposed so as to be shifted by 120° in electrical phase on a unit-by-unit basis of the stators adjacent to each other, and a three-phase current is caused to flow to each of the windings of the electric actuator so that the same action as an action in the case of a three-phase linear motor can be realized.

5. The gas circuit breaker according to claim 1, wherein the electric actuator includes:

the mover integrally formed of a plurality of pieces of permanent magnets or magnetic materials, lining up side-by-side while inverting a magnetization direction thereof;

a stator including a first magnetic pole and a second magnetic pole disposed in such a way as to vertically tuck the mover, a magnetic body linking the first magnetic pole to the second magnetic pole, thereby forming a path for a magnetic flux, and a winding wound around the first magnetic pole and the second magnetic pole, respectively;

a current detector for detecting a current flowing to the high-voltage conductor; and a control mechanism for varying the amount of a current to be supplied to the winding, so as to correspond to a current value detected by the current detector.

6. The gas circuit breaker according to claim 5, wherein a plurality of the stators are disposed in the traveling direction of the mover, the number of the stators being an integral multiple of 3, the winding is disposed so as to be shifted by 120° in electrical phase on a unit-by-unit basis of the stators adjacent to each other, and a three-phase current is caused to flow to each of the windings of the electric actuator so that the same action as an action in the case of a three-phase linear motor can be realized.

* * * * *